United States Patent [19]

Koehler

[11] Patent Number: 4,467,979
[45] Date of Patent: Aug. 28, 1984

[54] CORD REEL

[75] Inventor: Rudolph A. Koehler, Willowdale, Canada

[73] Assignee: Noma Inc., Scarborough, Canada

[21] Appl. No.: 344,760

[22] Filed: Feb. 1, 1982

[51] Int. Cl.³ .............................................. B65H 75/40
[52] U.S. Cl. ..................................... 242/96; 191/12.4
[58] Field of Search ........ 242/54 R, 96, 107, 107.4 R, 242/107.6; 191/12.2 R, 12.4; 200/153

[56] References Cited

U.S. PATENT DOCUMENTS

| | | | |
|---|---|---|---|
| 1,357,900 | 11/1920 | Redmon et al. | 200/153 X |
| 1,665,737 | 4/1928 | Gough | 200/153 |
| 2,274,330 | 2/1942 | Hammond | 200/153 |
| 2,301,104 | 11/1942 | Yost | 191/12.4 |
| 2,801,303 | 7/1957 | Pailing | 191/12.4 |
| 2,856,470 | 10/1958 | Hyde | 191/12.4 |
| 3,536,275 | 10/1970 | Salomon | 242/85 |
| 3,835,265 | 9/1974 | Sharpe | 191/12.4 |
| 3,837,448 | 9/1974 | Hagstrom | 191/12.4 |
| 4,244,536 | 1/1981 | Harrill | 242/96 |
| 4,338,497 | 7/1982 | Drew | 191/12.4 |

Primary Examiner—Leonard D. Christian
Attorney, Agent, or Firm—Swabey, Mitchell, Houle, Marcoux & Sher

[57] ABSTRACT

A cord reel wherein the cord is rendered operative only for such time as the cord is substantially unwound from the reel; when the cord is operative the reel is locked to prevent the cord being wound thereon. In the preferred embodiment the cord is rendered inoperative by capturing a cord connector at the hub end of the reel in a hub compartment, the compartment having a shutter interconnected with the reel lock. The captured connector when released may be drawn from the compartment to connect the cord to a convenience receptacle.

19 Claims, 5 Drawing Figures

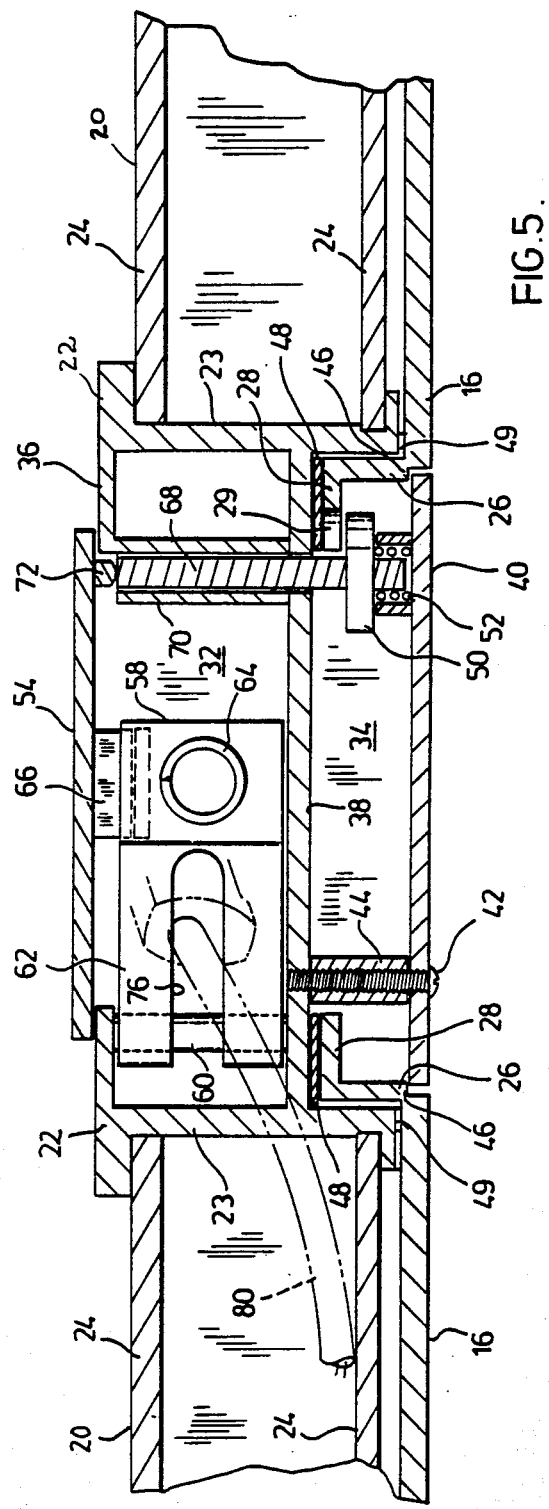

CORD REEL

FIELD OF INVENTION

This invention relates to cord reels used for storing electrical cord when not in use.

BACKGROUND OF INVENTION

Cord reels are well known in commerce at the present time. Generally they comprise a reel mounted for rotation within an enclosing housing. One end of the cord is normally terminated in a socket connector secured to the hub of the reel, the other end to a wandering plug connector. Generally when used only sufficient cord is unwound from the reel to permit the plug connector to be plugged into a close by convenience receptacle, and often the cord may be used with a significant number of turns of cord wound on the reel. The normal electrical rating of cords assumes their use in a linear, free air condition. When cords are used coiled on an enclosed reel, appreciable heat is generated due to resistive and inductive effects. For this reason cords stored on cord reels are required to be derated in current carrying capacity. Typically a cord of 8 m. length having a free air rating of 15a will be derated to about 10a when used with a cord reel. A 30 m. length of this cord would have so low a current rating when forming part of a cord reel as to be of very limited use. Conversely a 30 m. cord reel having a current rating of 15a would have considerable bulk and cost, and again would be of limited use. Moreover, it is required in certain jurisdictions to incorporate into the cord reel a current limiting device to limit the maxium current of a cord used with a cord reel to be derated value of the cord, thereby increasing the cost of the cord reel.

One of the prime potential uses of a 30 m cord reel is as an extension cord for lawn mowers. However, present cord reels, even if the cord stored thereon were of sufficient length and current carrying capacity, are not well adapted to this use, for the receptacle of present commercially available cord reels is normally provided in the hub of the reel, which would necessitate the reel itself having to be transported with the lawn mower. Moreover, if not infrequently occurs that an extension cord when used with a lawn mower is damaged by the cutting blade of the lawn mower. In cord reels of known designs, the cords are either of a non-standard type and/or they require electrical wire connections to be made to the reel receptacle. Replacement of a damaged cord may, then, not be within the competence of many persons, or it may necessitate the procurement of a relatively expensive cord replacement.

SUMMARY OF INVENTION

In accordance with a main aspect of the invention, there is provided a cord reel wherein means is provided to ensure that the cord is operational only during such time that it is substantially unwound from the reel. There is thus no necessity to derate the cord, hence cord stored on the cord reel is rated at its full, free air, current carrying capacity. Since the cord is not derated, there is moreover no necessity to incorporate any current limiting device into the cord reel.

In accordance with another aspect of my invention the cord connector at the reel hub is floating, that is to say it is not fixed relative to the hub, and cord may be withdrawn from the hub of the reel. Desirably the hub cord connector is a plug connector, whereby the cord reel when in use locates close to a convenience receptacle, rather than being close to the portable device being used with the cord reel, and the cord reel is not then any incumbrance.

In accordance with a still further aspect of the invention, the extension cord stored on the reel is of a standard nature, and replacement of the cord, in the event of accidental damage, may be readily carried out by the average person without necessitating the making of electrical connections.

In one embodiment of my invention, there is provided a cord reel wherein a first means is provided for rendering the cord inoperative when more than a predetermined amount of cord is wound on the reel, and operative when less than that amount is wound on the reel, and second means which is interconnected with the first means so as to prevent the cord from being wound onto the reel whenever the cord is operative.

The first means may be mechanical, so as to render the cord inoperative by capturing one of the cord connectors, for example, or electrical wherein one or more conductors of the cord are disconnected, for example; a mixture of mechanical and electrical expedients may of course be employed. Generally speaking the second means will be mechanical, and will be mechanically interconnected with the first means. However electromechanical interconnects are also envisaged.

In a further embodiment of the invention the second means comprises locking the reel to prevent the rotation thereof whilst the cord is operative. It is contemplated that the cord connector itself function as a key to the lock, so that when the "key" is in position and hence unusable for its electrical connecting function, the lock is unlocked; the disadvantage of such arrangement is its non-universality, in view of the many different connector arrangements in use in various countries. In accordance with a preferred embodiment the hub connector is enclosed within a compartment formed in the hub of the reel, the compartment having a door which is operable only when the cord is substantially unwound from the reel. As the door opens this causes the lock to move into position to lock the reel.

In accordance with yet another embodiment the compartment door is retained in its closed position by a latch which is operable only by tensioning the free end of the cord when the cord is withdrawn from the reel.

These aspects, embodiments and advantages of the invention will be rendered more clear from the following description of a presently preferred embodiment, from which description still further aspects and advantages will become apparent.

IN THE DRAWINGS

FIG. 1—is a perspective view of a cord reel in accordance with the invention with the cord rendered inoperative;

FIG. 2—is a perspective view similar to FIG. 1 with the cord rendered operative;

FIG. 3—is a plan view of the central portion of the cord reel of FIG. 1;

FIG. 4—is a fragmentary perspective view partly in axial section of central portions of the cord reel of FIG. 2, and FIG. 5—is a view along 5—5 of FIG. 3.

DESCRIPTION OF THE PREFERRED EMBODIMENT

Figure 1:
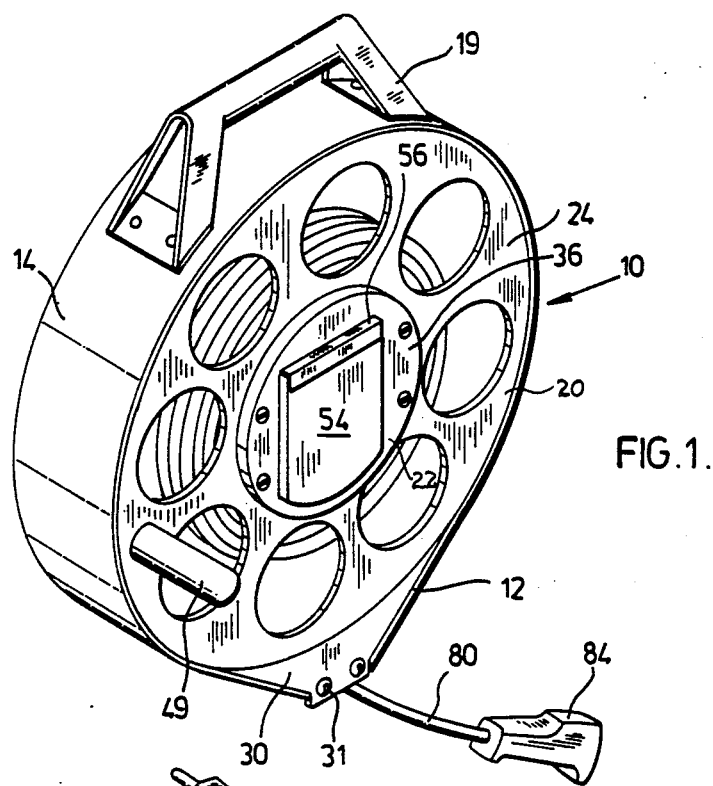
Figure 2:
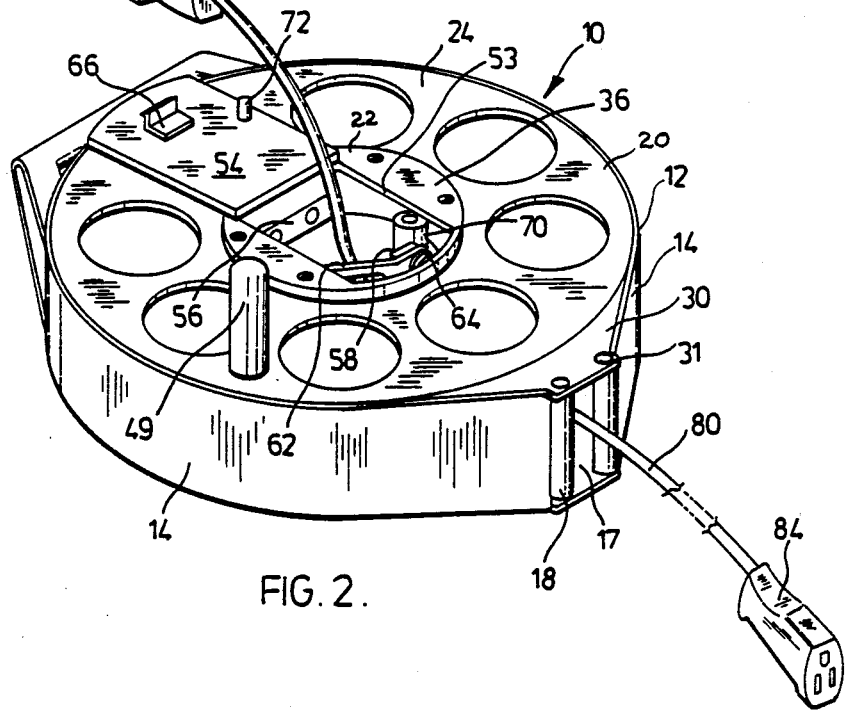
Figure 3:
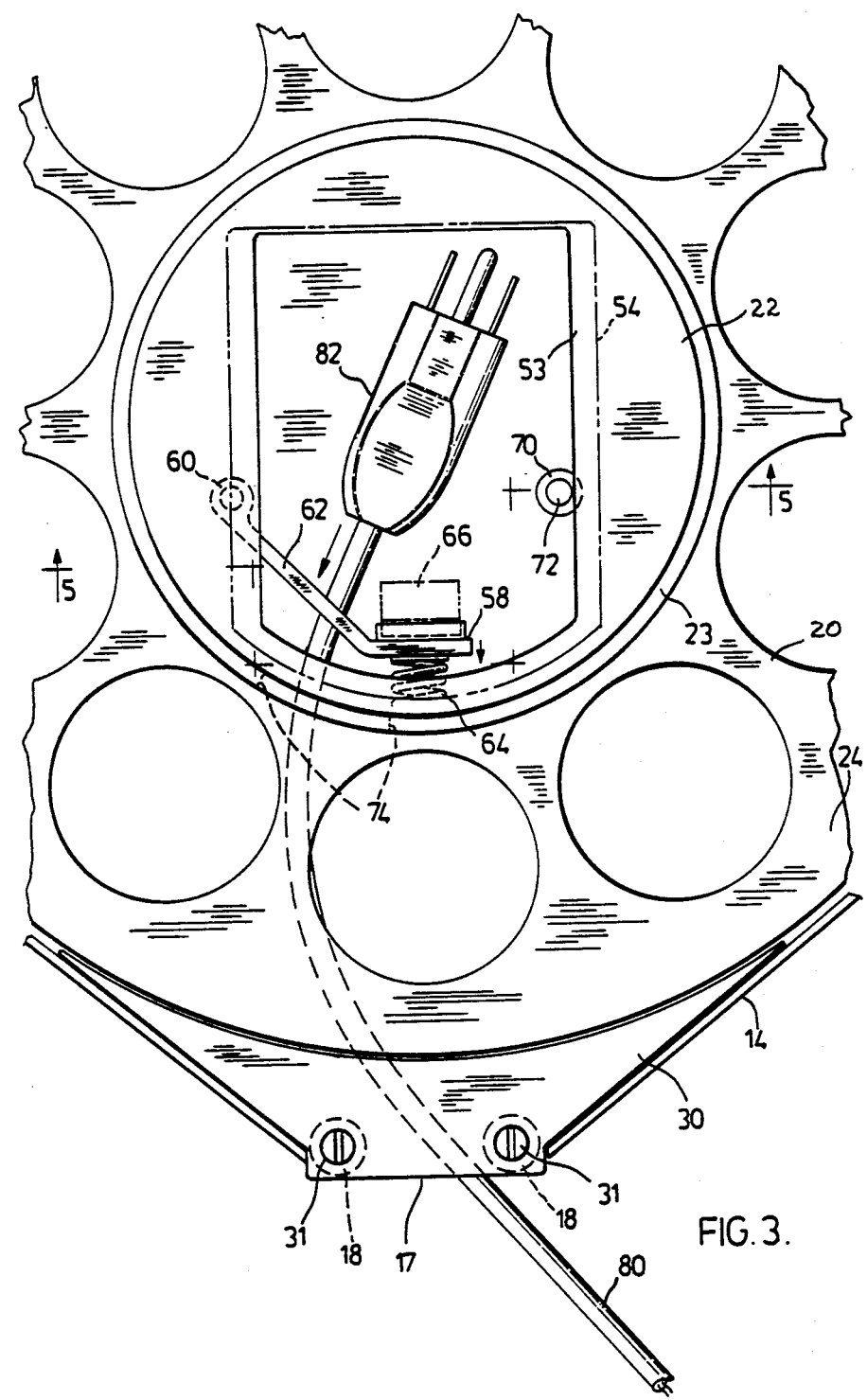
Figure 4:
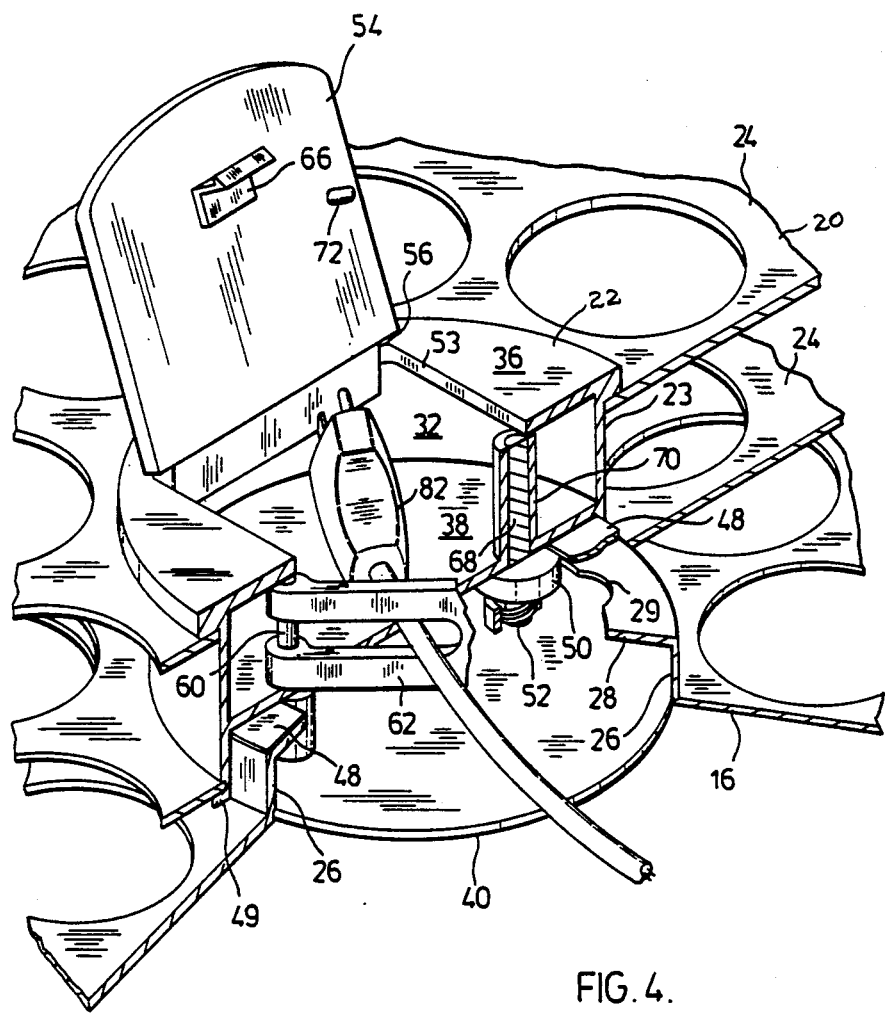

Referring to the drawings in detail, a cord reel is denoted generally therein by the numeral 10. Cord reel 10 comprises a housing 12 including a peripheral wall 14 and a radial wall 16 (FIGS. 4 and 5). Peripheral wall 14 is provided with an aperture thereto at 17, bounded and reinforced by smoothly rounded jambs 18, and a handle 19 angularly displaced from the aperture. Mounted for rotation within housing 12 is a reel 20 comprising a hub 22 including peripheral hub wall 23, from which there radiates opposed cheekwalls 24 parallel to radial housing wall 16. As seen in FIGS. 4 and 5, radial wall 16 has an inwardly turned portion at 26, this portion being concentrically located within hub 22 and spaced therefrom. Inwardly turned portion 26 terminates in a radial flange 28, the flange having a plurality of notches 29 disposed about the periphery thereof. Housing peripheral wall 14 generally closely surrounds the perimeter of cheek walls 24 to preclude access to the interior of the housing 12 therebetween. However, the peripheral wall is outwardly divergent towards aperture 17, and a shaped fillet 30 locates between upper cheek wall 24 and peripheral wall 14 in the vicinity of aperture 17, being releasably secured to jambs 18 by screws 31. It will be appreciated that fillet 30 serves to reinforce peripheral wall 14 in the vicinity of aperture 17. Radial housing wall 16 is integrally formed with a fillet portion similarly shaped to fillet 30 and which secures to the lower end of jambs 18 to close off the housing.

Hub 22 is divided into upper and lower compartments 32, 34 respectively by hub radial walls 36, 38 and 40, wall 40 being detachable from wall 38 and secured thereto by a plurality of machine screws 42 and spacers 44. Housing radial wall 16 is stepped at 46 and detachable hub radial wall 40 i dimensional to engage behind step 46, whilst being radially spaced therefrom, so as to prevent hub 22 being withdrawn from housing 12. Anti-friction washer 48 locates between flange 28 and the intermediate hub radial wall 38, permitting reel 20 to rotate freely within housing 12. A handle 49 is provided to rotate reel 20.

Within compartment 34 there locates a plunger 50 which is spring biased upwardly by helical spring 52. Plunger 50 is shaped and located so as to engage a notch 29 when in its upward position, thereby locking reel 20 to preclude the rotation thereof.

Hub radial wall 36 is windowed at 53 to provide access to upper compartment 32 of hub 22. Window 53 is closed by shutter 54 which is hinged at 56 along one side thereof to hub radial wall 36. Within compartment 32 is located at latch 58, which is pivotally secured at 60 to radial hub wall 38 by a furcated latch arm 62. Latch 58 is biased towards hinge 56 by a spring 64. Shutter 54 is provided with a downwardly dependent catch 66 which engages latch 58 to retain the shutter in a closed position thereby preventing access to upper compartment 32 of hub 22.

Plunger 50 is provided with a stem 68 which projects upwardly through hub radial wall 38 into upper compartment 32 to terminate within the boundary of window 53 adjacent hub radial wall 36. Lateral play of plunger stem 68 is precluded by a surrounding tubular wall 70 therefor mounted from wall 38. Shutter 54 is provided with a small downwardly dependent post 72 which locates so as to bear upon plunger stem 68 when the shutter 54 is in its closed position, and so disengage plunger 50 from notch 29, thereby unlocking reel 20 so as to permit the rotation thereof. An aperture 74 through hub peripheral wall 23 is provided in general radial alignment with the furcated opening in latch arm 62, thereby forming a passage from housing 12 into upper compartment 32.

Having described the structure of cord reel 10, the manner of operation thereof will now be described. A standard electrical extension cord 80 having a plug connector 82 and a socket connector 84 at opposed ends thereof has one end which enters housing 12 at aperture 17 and passes into upper compartment 34 via the passage provided by hub wall opening 74 and the furcation of latch arm 62 to float within the compartment, that is to say it is freely moveable within the confines thereof. Assuming connector 82 to be nested within hub compartment 32, as shown in FIG. 4, shutter 54 may be closed and latched into place, thereby capturing connector 82 within compartment 32 and rendering cord 80 inoperably for the purpose of supplying current to an electrical curcuit. As shutter 54 is moved to its latched position, post 72 simultaneously bears upon plunger stem 68 to force plunger 50 downwards out of contact with notch 30, thereby unlocking reel 20. Cord 80 may now be wound on reel 20 using handle 49. For as long as shutter 54 remains closed, cord 80 is effectively rendered inoperative.

Shutter 54 can be opened only by disengaging catch 66 from latch 58. Latch 58 is operable by applying tension to cord 80, thereby drawing connector 82 into contact with latch arm 62 and causing the latch arm to rotate against the bias of spring 64. Assuming cord 80 to be wound onto reel 20, tension applied to the cord extending from housing 12 will cause reel 20 to turn, and the cord will be unwound. No tension will be transmitted to connector 82 until cord 80 is essentially unwound from reel 80. Even assuming handle 49 were held to prevent reel 20 from rotating freely, tension applied to cord 80 would be expanded by frictional forces with any more than 2–3 turns of cord 80 on the reel. In practice, cord 80 is found to be fully unwound from reel 20, with apertures 17 and 74 in general radial alignment, prior to catch 66 being released. Once connector 82 is accessible, cord 80 becomes operable. By pulling on connector 82, cord is drawn through aperture 17 into hub 22 and through window 53 until a desired length of cord is obtained to connect plug 80 to a convenience receptacle or the like.

The spacing between jambs 18 is such as to permit cord 80 to be drawn readily into and from housing 12, but to prevent connector 84 from passing into the housing. In the event that it is required to replace cord 80, fillet 30 is detached from jambs 18 by withdrawing screws 31, thereby providing an opening of sufficient size to permit the passage of either connector 82 or 84 therethrough. Pivot 60, which retains furcated latch arm 62 in position, is withdrawn, thereby disengaging cord 80 and permitting either connector end 82 or 84 to be threaded through compartment aperture 74, and a new cord to be inserted in housing 12.

Whilst my invention has been particularized in relation to one specific embodiment thereof, it will be appreciated that many departures therefrom may be expedient whilst achieving the same ends, and it is intended that all such departures be encompassed within the scope of my invention.

I claim:

1. A cord reel comprising:

a housing;

a reel mounted for rotation within said housing;

a cord wound on said reel for storage thereon;

first means for rendering said cord inoperative when more than a predetermined amount of cord is wound on said reel, and for rendering said cord inoperative when less than said predetermined amount of cord is wound on said reel, and second means interconnected with said first means for preventing said cord being wound on said reel whenever said cord is operative.

2. A cord reel as defined in claim 1, wherein said second means comprises means for locking said reel to prevent the rotation thereof.

3. A cord reel as defined in claim 1 wherein said first means comprises means for capturing a connector at one end of said cord adjacent the hub of the reel so as to render said cord inoperative.

4. A cord reel as defined in claim 2, wherein said reel includes a hub portion, said one end being adjacent said hub portion, said hub portion having a compartment therein within which said connector is captured.

5. A cord reel as defined in claim 4, further comprising a shutter for closing said compartment to thereby capture said connector.

6. A cord reel as defined in claim 5, wherein said shutter includes a latch therefor which is actuatable to release said shutter and thereby provide access to said connector and so render said cord operative.

7. A cord reel as defined in claim 6, wherein said housing and said hub portion have radial openings therein through which said cord passes, and wherein said latch is actuatable to release said shutter by tensioning said cord when fully unwound from the reel when said radial openings are in general alignment.

8. A cord reel as defined in claim 7, wherein said means for locking said reel comprises a lock mounted on said reel for movement between a first position contacting said housing to lock said reel, and a second position out of contact with said housing, and wherein said shutter when moved to said closed position urges to said lock to said second position.

9. A cord reel as defined in claim 7, wherein said latch includes an operating arm through which said cord freely passes, tension on said cord causing a member mounted on said cord within said compartment to bear on said operating arm thereby actuating said latch to release said shutter as aforesaid.

10. A cord reel as defined in claims 8 or 9, wherein spring means is provided for biasing said lock is to said first position.

11. A cord reel as defined in claim 7, 8 or 9, wherein said connector is floating.

12. A cord reel comprising a housing, a reel mounted for rotation in said housing, said reel including a hub, said hub having a compartment housing an electrical connector terminating a cord stored on said reel;

a shutter for closing said compartment to prevent access to said connector;

means for opening said shutter, said means being operable only when said cord is substantially unwound from said reel, and lock means interconnected with said shutter for locking said reel when said shutter is open.

13. A cord reel as defined in claim 12, wherein said electrical connector is a plug connector.

14. A cord reel as defined in claim 12, wherein said electrical connector floats within said compartment.

15. A cord reel as defined in claim 12, 13 or 14, wherein a passageway is provided into said compartment to provide said cord to be drawn freely between said compartment and said housing.

16. A cord reel as defined in claim 12, 13 or 14, further comprising latch means closing said shutter and wherein said means for opening said shutter comprises said latch means being operable by tensioning said cord remote from said connector when unwound from said reel.

17. A cord reel as defined in claim 12, 13 or 14, wherein said lock means is interconnected with said shutter so that as said shutter is moved to its closed position said lock means is moved to unlock said reel.

18. A cord reel as defined in claim 12, 13 or 14, wherein said housing includes a wall having an opening therein sized to permit the passage of the cord therethrough whilst blocking passage of an end connector, and wherein said housing includes a moveable element which is moveable to increase the size of said opening to permit the passage of said end connector therethrough.

19. A cord reel as defined in claim 1 or 2, wherein said first means includes electrical switch means.

* * * * *